(12) United States Patent
Bendak et al.

(10) Patent No.: US 6,973,100 B1
(45) Date of Patent: Dec. 6, 2005

(54) SYSTEM AND METHOD FOR PROGRAMMING THE LOCATION OF FRAME SYNCHRONIZATION WORDS IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1054 days.

(21) Appl. No.: 09/746,490

(22) Filed: Dec. 22, 2000

(51) Int. Cl.[7] .............................................. H04J 3/06
(52) U.S. Cl. ..................... 370/510; 375/366; 714/789
(58) Field of Search ................................. 370/350, 370, 370/395.5, 401, 466, 467, 503, 505, 509–517, 370/527, 529; 375/356–357, 359, 362, 365, 375/366, 368; 714/775, 776, 789

(56) References Cited

U.S. PATENT DOCUMENTS

| | | | | |
|---|---|---|---|---|
| 4,719,624 | A | * | 1/1988 | Bellisio ...................... 370/513 |
| 5,251,205 | A | | 10/1993 | Callon et al. |
| 5,400,369 | A | * | 3/1995 | Ikemura ..................... 375/368 |
| 5,490,252 | A | | 2/1996 | Macera et al. |
| 5,568,471 | A | | 10/1996 | Hershey et al. |
| 5,661,763 | A | * | 8/1997 | Sands ......................... 375/368 |
| 5,666,108 | A | | 9/1997 | Duffy |
| 5,757,416 | A | * | 5/1998 | Birch et al. ................. 725/144 |
| 5,778,000 | A | | 7/1998 | Dosiere et al. |
| 5,793,976 | A | | 8/1998 | Chen et al. |
| 5,854,699 | A | | 12/1998 | Olshansky |
| 5,875,396 | A | | 2/1999 | Stockton et al. |
| 5,982,743 | A | | 11/1999 | Kusano |
| 6,006,069 | A | | 12/1999 | Langston |
| 6,400,734 | B1 | * | 6/2002 | Weigand ..................... 370/514 |
| 6,445,719 | B1 | * | 9/2002 | Schneider et al. .......... 370/506 |

* cited by examiner

Primary Examiner—Wellington Chin
Assistant Examiner—John Shew
(74) Attorney, Agent, or Firm—INCAPLAW; Terrance A. Meador (57) ABSTRACT

A system and method have been provided for programming synchronization features of a multidimensional digital frame structure. Such a frame structure acts as a digital wrapper, and includes overhead, payload, and forward error correction (FEC) sections. Words in the overhead section are used to synchronize the frame structure. The described invention permits the location of the frame synchronization bytes (FSBs) to be made programmable, so that the system and method are flexible for changes in communication protocols. This flexibility also impacts the number, the value, bandwidth, and the allowable bit error rate (BER) of the located FSBs.

52 Claims, 5 Drawing Sheets

SYSTEM AND METHOD FOR PROGRAMMING THE LOCATION OF FRAME SYNCHRONIZATION WORDS IN A MULTIDIMENSIONAL DIGITAL FRAME STRUCTURE

RELATED APPLICATIONS

This application contains material related to the following commonly assigned co-pending U.S. patent applications, incorporated herein by reference:

Ser. No. 09/745,655, filed 22 Dec. 2000 for "SYSTEM AND METHOD FOR PROGRAMMING THE VALUE OF FRAME SYNCHRONIZATION WORDS IN A MULTIDIMENSIONAL DIGITAL FRAME STRUCTURE"

Ser. No. 09/747,380, filed 22 Dec. 2000 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE"

Ser. No. 09/746,152, filed 22 Dec. 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE"

Ser. No. 09/745,793, filed 22 Dec. 2000 for "SYSTEM AND METHOD FOR SELECTIVELY BROADCASTING A MULTIDIMENSIONAL DIGITAL FRAME STRUCTURE"

Ser. No. 09/747,072, filed 22 Dec. 2000 for "SYSTEM AND METHOD FOR PROGRAMMING LOSS OF SYNCHRONIZATION IN A MULTIDIMENSIONAL DIGITAL FRAME STRUCTURE"

Ser. No. 09/745,774, filed 22 Dec. 2000 for "SYSTEM AND METHOD FOR PROGRAMMING SYNCHRONIZATION CRITERIA IN A MULTIDIMENSIONAL DIGITAL FRAME STRUCTURE"

Ser. No. 09/746,159, filed 22 Dec. 2000 for "SYSTEM AND METHOD FOR TRANSLATING OVERHEAD BYTES IN A MULTIDIMENSIONAL DIGITAL FRAME STRUCTURE"

Ser. No. 09/527,343, filed 17 Mar. 2000 for "TRANSPOSABLE FRAME SYNCHRONIZATION STRUCTURE"

Ser. No. 09/528,021, filed 17 Mar. 2000 for "PROGRAMMABLE SYNCHRONIZATION STRUCTURE WITH AUXILIARY DATA LINK"

BACKGROUND OF THE INVENTION

1. Field of the Invention

This invention generally relates to communications embodied using a digital wrapper and, more particularly, to a system and method for programming the selection of frame synchronization word locations in a communication frame structure 2. Description of the Related Art Frame synchronization is used in most communication technologies where extra bandwidth is required to add functionality into the original data stream. There is no standard practice with respect to the bandwidth allocation of frame synchronization words. Neither is there an ability to customize the use of that bandwidth and synchronization thresholding adaptive to various bit error rate conditions in a variable rate forward error correction (FEC) system implementing interleaved multi-frame superframes.

It would increase bandwidth if all the bytes, or words of a digital frame structure could be devoted to payload. However, a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the quantity, location, or value of frame synchronization bytes. Hardware devoted to any particular protocol or implementation quickly becomes obsolete. An exclusively software approach to managing communications is cumbersome.

It would be advantageous if communication hardware could be developed that permitted flexibility in defining the frame synchronization bytes, so as to permit the hardware to be used in a number of communication standards.

It would be advantageous if the location of frame synchronization bytes (FSBs) could be made selectable in a multidimensional digital frame structure.

Likewise, it would be advantageous if the quantity, value, and bit error rates of the FSBs could be made selectable to accommodate a number of communication standards, or changes to existing standards.

SUMMARY OF THE INVENTION

Accordingly, an integrated circuit communication device is provided that includes programmable features to allocate bandwidth for frame synchronization words, and set up the error thresholding, adjusting the robustness to bit errors and the time required to achieve synchronization. More specifically, the device provides for:

a programmable frame synchronization word bandwidth;

programmable frame synchronization words;

different synchronization words with independent allocated bandwidths;

frame synchronization word translation between the decoder and encoder;

frame synchronization word error thresholding for system robustness;

programmable synchronization (in-to-sync) parameters; and programmable out-of-sync synchronization parameters.

Broadly, this invention describes a structure for programming key features in a frame synchronization system using a multidimensional digital frame. More particularly, an example of the invention is provided in a programmable framing structure for a forward error correction (FEC) encoded channel interleaved to 16 levels with a 4 frame superframe. The structure allocates the amount of bandwidth dedicated to the frame synchronization words, to control the speed of synchronization, and the robustness to channel noise. As an added benefit, a programmable synchronization threshold can be set to even further increase the robustness to channel noise and to decrease the synchronization time under high bit error rate conditions. These techniques together permit increased network security and partitioning, as well as dynamic reallocation of the bandwidth occupied for framing based on link conditions, without corrupting user data.

Details of the programmable communication IC and a method for variably programming the frame synchronization structure in a multidimensional digital frame structure are provided below.

DETAILED DESCRIPTION OF THE PREFERRED EMBODIMENTS

Figure 1:
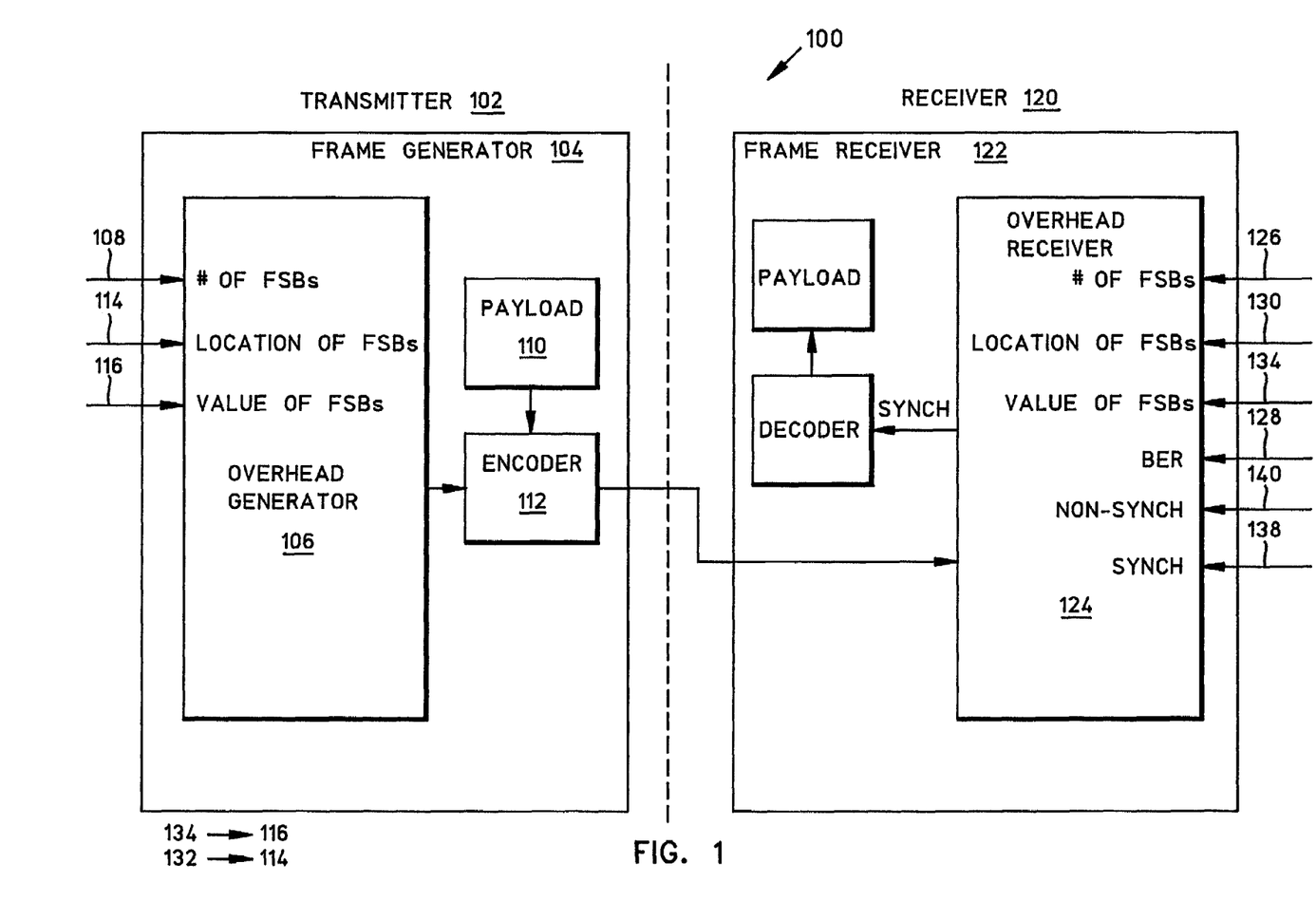
FIG. 1 is a schematic block diagram of a system for variably programming frame synchronization in the communication of a multidimensional digital frame structure.

FIG. 1 is a schematic block diagram of a system for variably programming frame synchronization in the communication of a multidimensional digital frame structure. The system 100 comprises a transmitter 102 with a frame generator 104. The frame generator 104 includes an overhead generator 106 having an input to accept commands on line 108 for selecting the number (quantity) of synchronization bytes in the overhead section of a frame. A payload generator 110 supplies the information that is to be transmitted. The information can be input to the transmitter 102, or it can be the payload of a previously received frame. In this case, the transmitter 102 would be acting as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. The overhead generator 106 accepts commands to select the location of FSBs on line 114, and the values of the FSBs on line 116.

Figure 2:
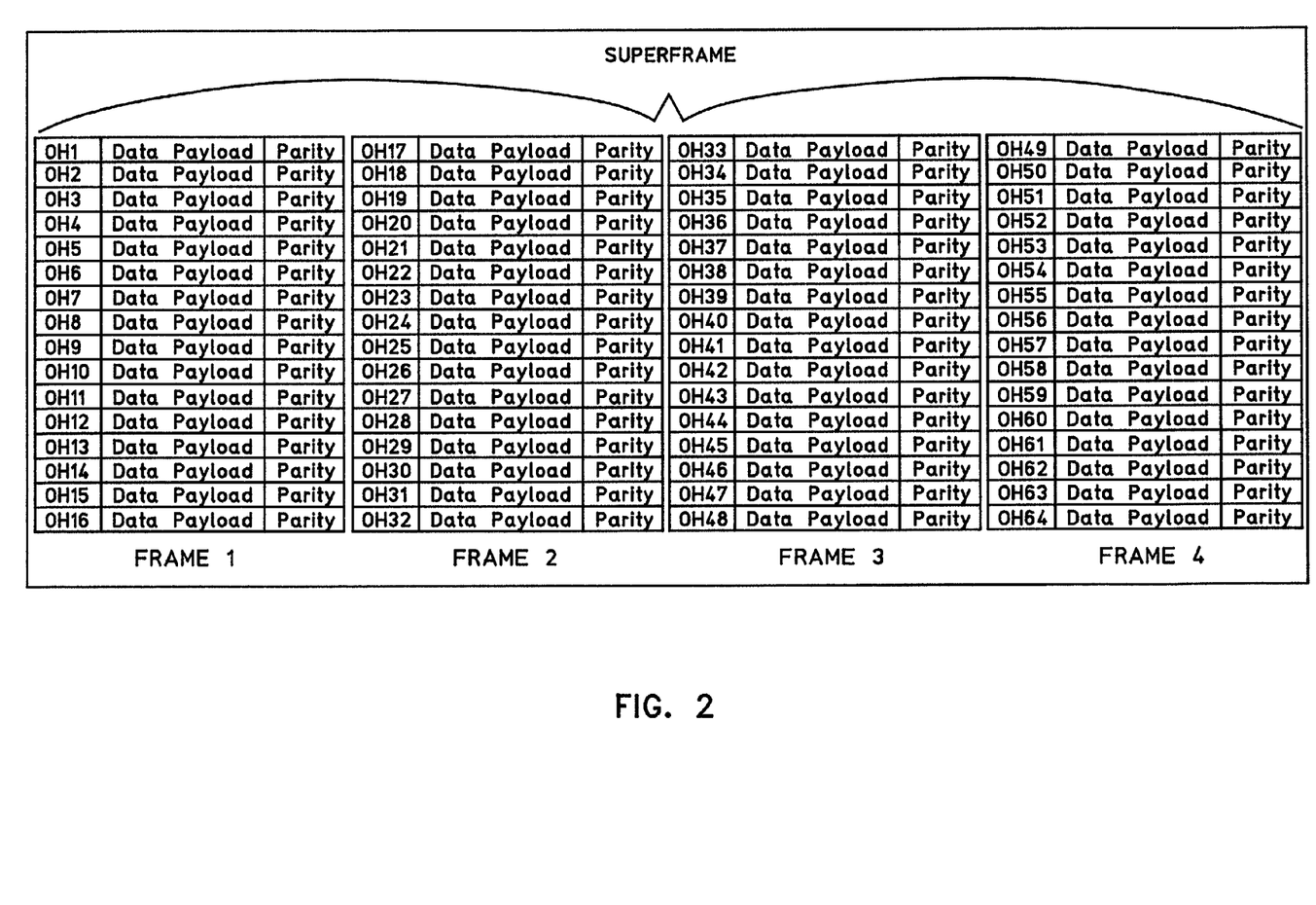
FIG. 2 is a diagram illustrating a multidimensional digital frame structure.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular number of bytes to the overhead, payload, and FEC sections, or to any particular number of rows.

Returning to FIG. 1, the system 100 includes a receiver 120 with a frame receiver 122. The frame receiver 122 includes an overhead receiver 124 with an input on line 126 to accept commands for selecting the number (quantity) of frame synchronization bytes for synchronizing the received frame. The overhead receiver accepts commands concerning the bit error rate of the FSBs on line 128, the location of the FSBs on line 130, and the value of the FSBs on line 134. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention, the receiver 120 is part of a relay, and the payload is relayed as is, or modified before it is retransmitted.

Returning to FIG. 2, it can be seen that a superframe includes a plurality of frames. Four frames are shown, but the present invention is not limited to any particular number of frames per superframe. Returning to FIG. 1, the frame generator 104 defines a superframe structure with a predetermined number of frames per superframe. Then, the overhead generator 106 selects locations for the FSBs in the overhead section of each frame of the superframe. Likewise, the overhead receiver 124 recognizes frame synchronization bytes in each frame of the superframe. In some aspects of the invention, the overhead receiver 124 selects the number of frame synchronization bytes required for recognition, for each frame, in response to commands on line 138.

Using the example of FIG. 2, the frame generator 104 forms a superframe consisting of a first, second, third, and fourth frame, and the overhead generator 106 supplies FSBs in first locations for the first frame, second locations for the second frame, third locations for the third frame, and fourth locations for the fourth frame. It should be understood that a "location" may include one or more bytes. It should also be understood that these locations may, or may not, be the same between frames. That is, the first and second locations may, or may not be, the same location in different frames. Typically, only the first frame includes FSB bytes, so that the overhead generator selects no byte locations in the second, third, and fourth frames.

In the simple case, the frame receiver 122 forms a superframe consisting of a first, second, third, and fourth frame, and the overhead receiver 124 selects FSBs in a first location for the first frame, a second location for the second frame, a third location for the third frame, and a fourth location for the fourth frame. Again, it is typical that the overhead receiver 124 selects no FSB locations in the second, third, and fourth frames.

The overhead receiver 124 also selects the number of consecutive frames that must be recognized, in response to commands on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs.

In some aspects of the invention, the overhead receiver 124 selects byte locations for each frame of the superframe, and recognizes the selected number of frame synchronization bytes in each frame of the superframe. Likewise, the overhead generator 106 accepts commands to select byte locations in the range from zero to the first plurality, where there are a first plurality of FSB locations per frame.

The frame generator 104 forms a superframe structure with a predetermined number of frames per superframe, and the overhead generator 106 supplies a selectable number of frame synchronization byte locations for the overhead section of each frame of the superframe. For example, frame generator 104 forms a superframe with a first, second, third, and fourth frame. Then, the overhead generator 106 supplies first selected frame synchronization byte locations for the first frame, second frame synchronization byte locations for the second frame, third FSB locations for the third frame, and fourth FSB locations for the fourth frame.

The frame receiver 122 supplies a frame with a first plurality of overhead byte locations, and the overhead receiver 124 accepts commands to select frame synchronization byte locations in the range from zero to the first plurality. The frame receiver 122 forms a superframe structure with a predetermined number of frames per superframe. Then, the overhead receiver 124 selects the location of frame synchronization bytes required for the recognition of a received frame from the overhead section of each frame of the superframe. For example, the overhead receiver 124 selects a first location for a first frame of the superframe, and synchronizes the first frame by recognizing FSBs in the first location in the first frame of the superframe.

As mentioned above, the overhead receiver 124 selects the number of frame synchronization bytes. When the frame receiver 122 forms a superframe with a first, second, third, and fourth frame, the overhead receiver 124 selects a first number of frame synchronization byte locations for the first frame, a second number of frame synchronization byte locations for the second frame, a third number of FSB locations for the third frame, and a fourth number of FSB locations for the fourth frame. In some aspects of the invention, the number of selected locations equals the selected number of FSBs. Alternately, the system 100 may purposely choose to send other overhead bytes in the FSB location, in certain circumstances, so that the quantity of FSBs does not match the number of FSB locations.

The overhead receiver 124 also selects FSB values. For example, the overhead receiver selects frame synchronization bytes having a first value in first byte locations, and frame synchronization bytes having a second value in second byte locations. In addition, the overhead receiver 124 selects the bit error rate required for the recognition of each selected frame synchronization byte location.

In a simple aspect of the invention, the overhead receiver 124 uses all the FSB locations that are provided in the frame by the overhead generator 106. That is, the overhead generator 106 selects a first location for frame synchronization bytes in the overhead section of a frame, and the overhead receiver 124 selects the (same) first frame synchronization byte locations for recognition for the first frame. In context of the superframe structure, this reasoning would also apply to the second, third, and fourth frames of the superframe. That is, the overhead receiver would select all the FSB locations provided in the second, third, and fourth frames.

However, the overhead receiver need not select all the FSBs locations that have been supplied by the overhead generator 106. For example, when the overhead generator supplies FSBs in a first location for a first frame, the overhead receiver 124 can select FSBs in a second location that is a subset of the first location for the first frame. The overhead receiver synchronizes the received frame in response to recognizing the FSBs in the second location in the first frame. This application may be necessary when the receiver 120 uses a different protocol than transmitter 102. Other protocol translation features of the invention are discussed in "System and Method for Translating Overhead Bytes in a Multidimensional Digital Frame Structure", G. Bendak et al., filed 22 Dec. 2000, Ser. No. 09/746,490.

As mentioned above, the overhead receiver 124 has an input on line 128 to accept commands for selecting the bit error rate (BER) required for the recognition of a frame synchronization byte. For example, the overhead receiver 124 can select a number of permitted errors for each frame synchronization byte in the range from zero to a second plurality of errors, where each byte includes a second plurality of bits. The BER can be independently set for different FSB locations in a single frame. Likewise, the BER can be set for different locations between frames, or between superframes. The BER can be made to correspond to the FSB quantity and/or the FSB value. More typically, the selected BER represents an average BER of the FSBs in the selected byte locations. The average can be across the span of a frame, or longer spans. Regardless, the overhead receiver 124 recognizes frame synchronization bytes having a bit error rate less than, or equal to, the selected frame synchronization bit error rates.

As mentioned above, the overhead generator accepts commands on line 108 to select the quantity of FSBs in each frame. Likewise, the overhead receiver 124 accepts commands for selecting the number of the bytes on line 126 to be used for the frame synchronization of received frames. The overhead receiver 124 synchronizes the received frame in response to recognizing the number of frame synchronization bytes in the selected locations. For example, the overhead receiver 124 selecting a first number of FSBs, and synchronizes the received frame in response to recognizing the first number of frame synchronization bytes in the selected FSB locations.

It should also be understood that the frame locations can vary between frames, and between superframes. For example, the overhead receiver 124 selects first locations in a first frame of the superframe, and second locations in a second frame. Then, the received frame is synchronized in response to recognizing frame synchronization bytes in the first selected locations in the first frame and the second selected locations in the second frame. Looking at FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the abovementioned byte locations.

In a simple aspect of the invention, the overhead generator 106 selects first locations for a first number of frame synchronization bytes, in response to commands on line 114, and the overhead receiver 124 selects the first locations for the first number of frame synchronization bytes. However, the overhead receiver need not select all the locations provided by the overhead generator 106. For example, the overhead generator 106 selects a first number of frame synchronization bytes in the first location, and the overhead receiver 124 selects a second number of frame synchronization bytes, less than the first number in a second location, and synchronizes the received frame in response to recognizing frame synchronization bytes in the second locations. Momentarily examining FIG. 2, the overhead generator 106 may supply FSBs in locations OH 1 through OH 6, while the overhead receiver selects locations OH 4 through OH 6 for use.

In some aspects of the invention, the overhead generator 106 accepts commands for selecting the values of the FSBs, and the overhead receiver accepts commands for selecting the values of each frame synchronization byte on line 116, for each selected byte location. The overhead receiver 124 synchronizes the received frame in response to recognizing the values of synchronization bytes in the selected locations. Typically, the FSB word is a byte of eight bits, although the invention is not limited to an FSB word of any particular length. With eight bit values, $2^8$ possible FSB values are possible for any FSB. Assuming that one frame includes sixteen bytes, and that all the byte locations are selected as FSB locations, a single FSB value can be used in all sixteen locations. At the other extreme, sixteen different byte values can be used, a different value for each byte location. In short, the overhead generator 106 can select frame synchronization bytes having a first value, in a first number of locations, and frame synchronization bytes having a second value, in a second number of locations.

Although an example using two different FSB values is presented above, it is possible to have as many FSBs as there are rows in a frame. Thus, in the frame structure of FIG. 3, each frame could have a first plurality (sixteen in the example of FIG. 2) of unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects a first number of frame synchronization byte locations for a first value in a first frame and a second number of frame synchronization byte locations for a second value in a second frame. The overhead receiver synchronizes the received frame in response to recognizing the first number of frame synchronization byte locations having the first value in the first frame and the second number of frame synchronization byte locations having the second value in the second frame.

In a simple aspect of the invention, the overhead generator 106 selects frame synchronization bytes having a first value, in response to commands on line 116, and the overhead receiver 124 selects frame synchronization bytes having the first value. However, the overhead receiver 124 need not select all the FSB values supplied by the overhead generator. For example, the overhead generator 106 selects first frame synchronization byte locations having a first value and second frame synchronization byte locations having a second value. The overhead receiver 124 selects third locations, fewer in number than the first number, having the first value, and fourth locations, fewer in number than the second number, having the second value. The overhead receiver 124 synchronizes the received frame in response to recognizing the third frame synchronization byte locations having the first value, and the fourth frame synchronization byte locations having the second value.

When the overhead receiver is not able to recognize FSBs, synchronization is lost. Once again, the way in which the system loses synchronization is programmable. The overhead receiver 124 accepts commands on line 140 for selecting a number of consecutive non-recognized frames. Then, the overhead receiver 124 falls out of synchronizing in response to the selected number of consecutively non-recognized frames.

Figure 3:
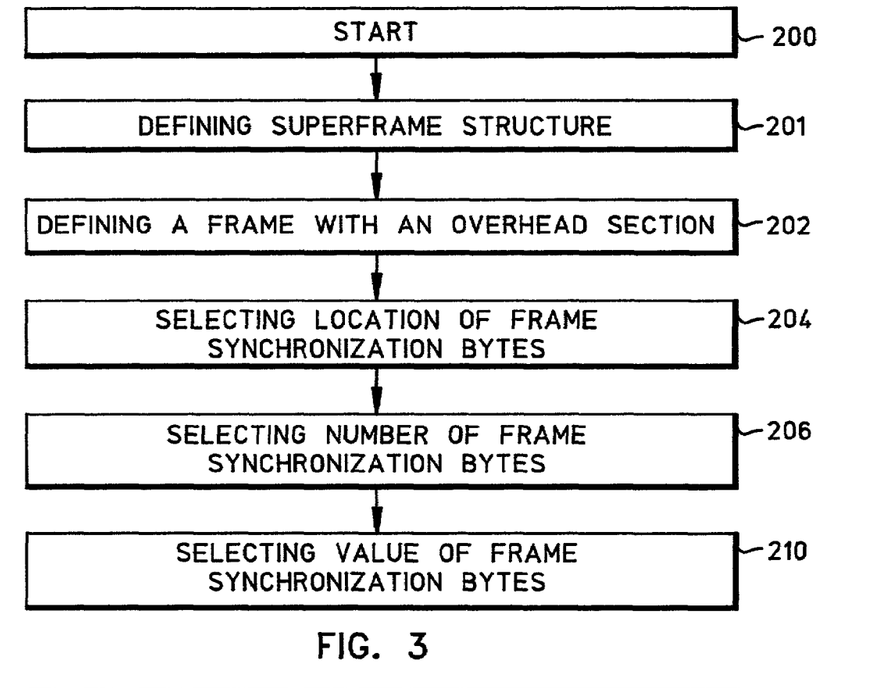
FIG. 3 is a flowchart depicting a method for variably programming the location of frame synchronization bytes in a transmitted multidimensional digital frame structure.

FIG. 3 is a flowchart depicting a method for variably programming the location of frame synchronization bytes in a transmitted multidimensional digital frame structure. The method begins at Step 200. Step 202 defines a frame with an overhead section having a predetermined number of bytes. Step 204 selects the location of the bytes in the overhead section to be used for frame synchronization.

In some aspects of the invention, defining a frame in Step 202 includes defining the overhead section to include a first plurality of overhead byte locations. Selecting the location of the bytes in the overhead section to be used for frame synchronization in Step 204 then includes selecting locations in the range from zero to the first plurality of byte locations.

In some aspects of the invention, a further step, Step 206, selects the number of bytes in the overhead section to be used for frame synchronization. Selecting the number of bytes in the overhead section in Step 206 includes selecting a first number of bytes in the range from zero to the first plurality of bytes. Selecting the location of the bytes in the overhead section to be used for frame synchronization in Step 204 includes selecting locations for the first number of byte locations.

In some aspects of the invention, Step 201 defines a superframe structure with a predetermined number of frames per superframe. Selecting the location of frame synchronization bytes in the overhead section in Step 204 includes selecting the location of bytes in the overhead section of each frame.

In some aspects of the invention, defining a superframe structure with a predetermined number of frames per superframe in Step 201 includes defining a first and a second frame in the superframe. Selecting the location of frame synchronization bytes in the overhead section in Step 204 includes selecting a first byte location in the first frame and a second byte location in the second frame.

In some aspects of the invention, defining a superframe structure with a predetermined number of frames per superframe in Step 201 includes defining a superframe consisting of a first, second, third, and fourth frame. Selecting the location of frame synchronization bytes in the overhead section in Step 204 includes selecting a first byte location in the first frame, a second byte location in the second frame, a third byte location in the third frame, and a fourth byte location in the fourth frame. In some aspects of the invention, selecting the location of frame synchronization bytes in the overhead section in Step 204 includes selecting no byte locations in the second, third, and fourth frames. That is, the FSBs are located in the first frame only.

In some aspects of the invention a further step, Step 210 selects the value of the frame synchronization bytes. In some aspects of the invention, Step 202 includes defining the frames so that each byte has a second plurality of bits. Selecting the value of the frame synchronization bytes in Step 210 then includes selecting a second plurality of bits for each frame synchronization byte value. Selecting the location of frame synchronization bytes in the overhead section in Step 204 includes locating a plurality of frame synchronization byte values in a plurality of byte locations.

In some aspects of the invention, selecting the location of frame synchronization byte values in Step 204 includes selecting frame synchronization bytes, having a first value, in a first location, and frame synchronization bytes, having a second value, in a second location.

Figure 4:
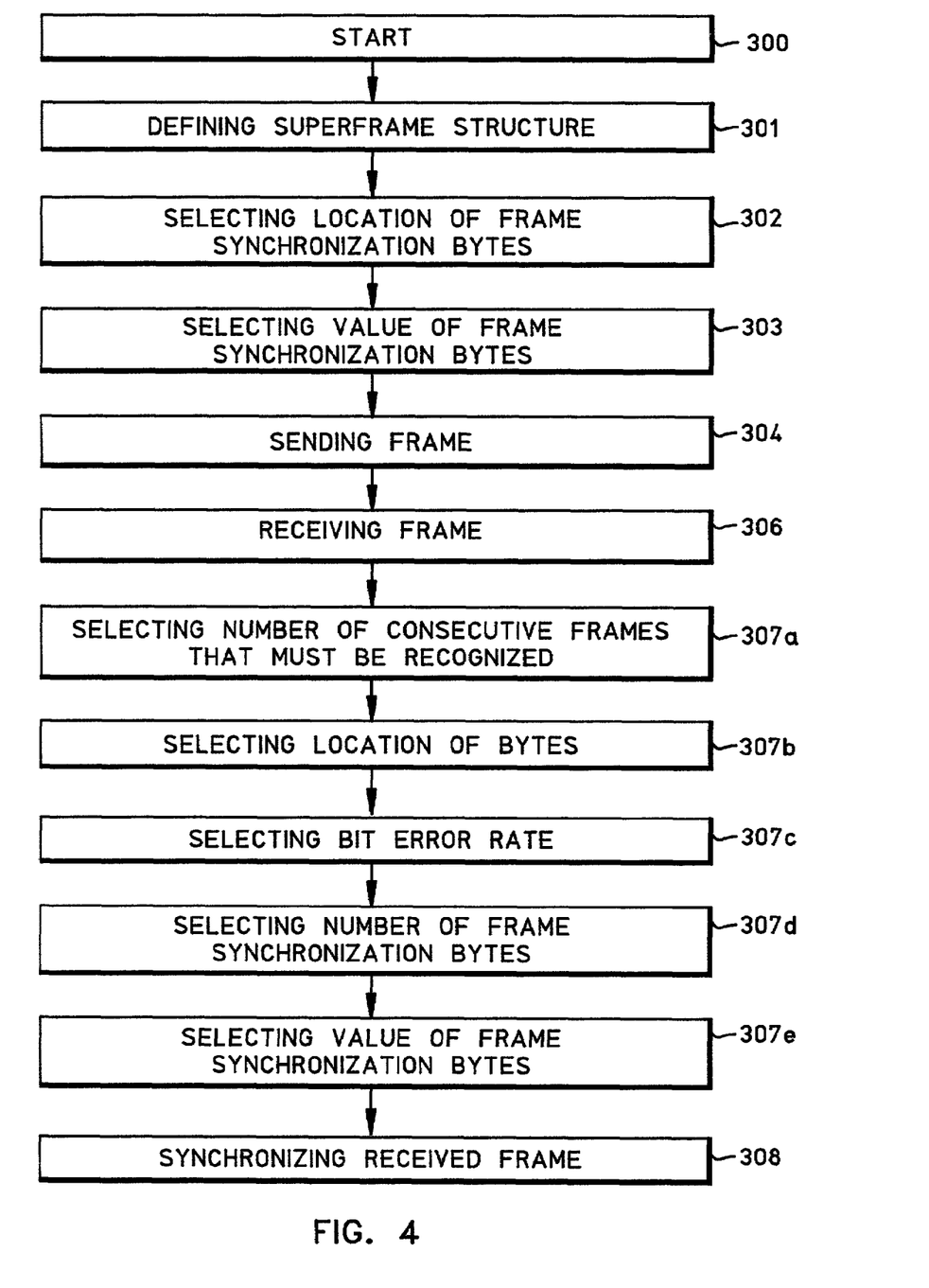
FIG. 4 is a flowchart depicting a method for variably programming the location of frame synchronization bytes in the communication of a multidimensional digital frame structure.

FIG. 4 is a flowchart depicting a method for variably programming the location of frame synchronization bytes in the communication of a multidimensional digital frame structure. The method begins with Step 300. Step 302 selects the location of frame synchronization bytes in the overhead section of a transmitted frame. Step 304 sends the frame. Step 306 receives the frame. Step 308 synchronizes the received frame in response to recognizing the frame synchronization bytes.

Step 307a selects the number of consecutive frames that must be recognized. Synchronizing the received frame in response to recognizing the frame synchronization bytes in Step 308 includes synchronizing the received frame in response to the selected number of recognized frames.

Step 307b selects the location of the bytes to be used for the frame synchronization of received frames. Synchronizing the received frames in response to recognizing the frame synchronization bytes in Step 308 includes recognizing frame synchronization bytes in response to the selected locations of the frame synchronization bytes in the received frame.

Selecting the location of the frame synchronization bytes in the received frame in Step 307b includes selecting a first number of locations. Synchronizing the received frame in response to recognizing the frame synchronization bytes in Step 308 includes synchronizing the received frame in response to recognizing the first number of frame synchronization bytes in the selected locations.

In some aspects of the invention, selecting the location of the frame synchronization bytes in a transmitted frame in Step 302 includes selecting first locations in a first frame of the superframe, and second locations in a second frame. Synchronizing the received frame in response to recognizing the frame synchronization bytes in Step 308 includes synchronizing the received frame in response to recognizing frame synchronization bytes in the first selected locations in the first frame and the second selected locations in the second frame.

In some aspects of the invention, selecting the location of frame synchronization bytes in the overhead section of a transmitted frame in Step 302 includes selecting a first number of frame synchronization byte locations. Selecting the location of the bytes to be used for frame synchronization of the received frame in Step 307b includes selecting locations for the first number of frame synchronization bytes.

In some aspects of the invention, selecting the number of frame synchronization bytes in the overhead section of a transmitted frame in Step 302 includes selecting a first number of frame synchronization bytes in a location. Selecting the location of the bytes to be used for frame synchronization of the received frame in Step 307b includes selecting a second number of frame synchronization bytes in the location, less than the first number. Synchronizing the received frame in response to recognizing the frame synchronization bytes in Step 308 includes synchronizing the received frame in response to recognizing frame synchronization bytes in the second number of FSBs in the selected location.

In some aspects of the invention, a further step, Step 307c, selects the bit error rate required for the recognition of a frame synchronization byte in a received frame. Selecting a bit error rate in Step 307c includes selecting an average BER for the FSBs in the locations selected in Step 302.

Synchronizing the received frame in response to recognizing the frame synchronization bytes in Step 308 includes recognizing frame synchronization bytes having a bit error rate less than, or equal to, the selected frame synchronization bit error rates.

Some aspects of the invention include a further step. Step 301 defines a superframe structure with a predetermined number of frames per superframe. Selecting the location of frame synchronization bytes in the overhead section of a frame in Step 302 includes selecting the location of bytes to be used for synchronization in the overhead section of each frame of the superframe. Sending the frame in Step 304 includes sending frames in the superframe structure. Synchronizing the received frame in response to recognizing the frame synchronization bytes in Step 308 includes recognizing frame synchronization bytes in each frame of the superframe.

In some aspects of the invention, a further step, Step 307d selects the number of frame synchronization bytes required for the recognition of a received frame. Selecting the number of frame synchronization bytes required for the recognition of a received frame in Step 307d includes selecting a number of bytes for each frame of the superframe. Synchronizing the received frame in response to recognizing the frame synchronization bytes in Step 308 includes recognizing the selected number of frame synchronization bytes in each frame of the superframe.

In some aspects of the invention, selecting the number of frame synchronization bytes required for the recognition of a received frame in Step 307d includes selecting a first number of frame synchronization bytes in the first number of locations of a first frame. Synchronizing the received frame in response to recognizing frame synchronization bytes in Step 308 includes recognizing the first number of frame synchronization bytes in the first number of locations of the first frame. In other aspects, Step 307d selects a second number of FSBs, less than the first number, in the first locations.

Some aspects of the invention include a further step. Step 307e selects the value of the frame synchronization byte in each byte location. Synchronizing the received frame in response to recognizing the frame synchronization bytes in Step 308 includes recognizing the values of the frame synchronization bytes in selected locations.

In some aspects of the invention, selecting the value of each frame synchronization byte in Step 307e includes selecting a first frame synchronization byte value in first locations, and a second frame synchronization byte value in second locations. Synchronizing the received frame in response to recognizing the frame synchronization bytes in Step 308 includes synchronizing the received frame in response to recognizing the frame synchronization byte value in the first number of locations, and the frame synchronization byte value in the second number of locations.

Step 303 selects the value of the frame synchronization byte in each selected location of the transmitted frame. Selecting the value of the frame synchronization byte in each selected location of the transmitted frame in Step 303 includes selecting frame synchronization bytes, having a first value in first locations. Selecting the value of each frame synchronization byte in the received frame in Step 307e includes selecting the frame synchronization bytes, having the first value in the first locations.

Figure 5:
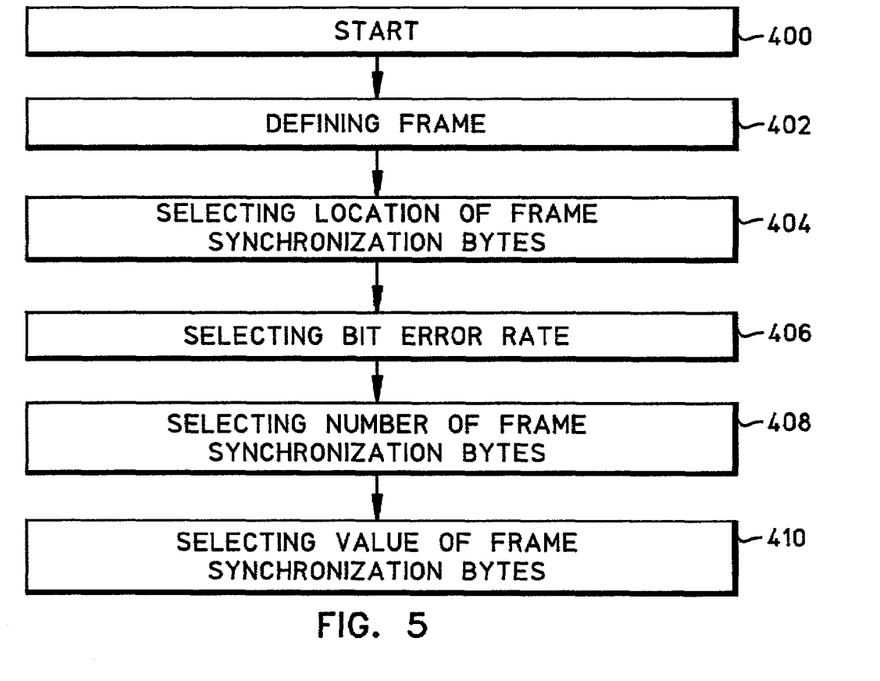
FIG. 5 is a flowchart depicting a method for variably programming the location of frame synchronization bytes in the receiving of a multidimensional digital frame structure.

Selecting the value of the frame synchronization byte in each selected location of the transmitted frame in Step 303 includes selecting frame synchronization bytes, having a first value in first locations, and frame synchronization bytes, having a second value in second locations. Selecting the value of each frame synchronization byte in the received frame in Step 307e includes selecting the first frame synchronization byte value in third locations, fewer in number than the first location, and the second frame synchronization byte value in fourth locations, fewer in number than the second locations. Synchronizing the received frame in response to recognizing the frame synchronization bytes in Step 308 includes synchronizing the received frame in response to recognizing the frame synchronization bytes having the first value in the third locations, and the frame FIG. 5 is a flowchart depicting a method for variably programming the location of frame synchronization bytes in the receiving of a multidimensional digital frame structure. The method begins with Step 400. Step 402 defines a frame with an overhead section having a predetermined number of bytes. Step 404 selects the location of the bytes in the overhead section to be used for frame synchronization.

Step 406 selects the bit error rate required for the recognition of a frame synchronization byte. In some aspects of the invention, selecting a frame synchronization byte bit error rate in Step 406 includes selecting an average BER for the FSBs in the location selected in Step 404.

In some aspects, selecting the location of frame synchronization bytes in Step 404 includes selecting frame synchronization bytes, having a first bit error rate, in a first location, and frame synchronization bytes, having a second bit error rate, in a second location.

In some aspects, Step 408 selects the number of bytes in the overhead section to be used for frame synchronization. Step 410 selects the value of the frame synchronization bytes.

An example of the above broadly-stated invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255,239) for 8 byte correction.

Figure 6:
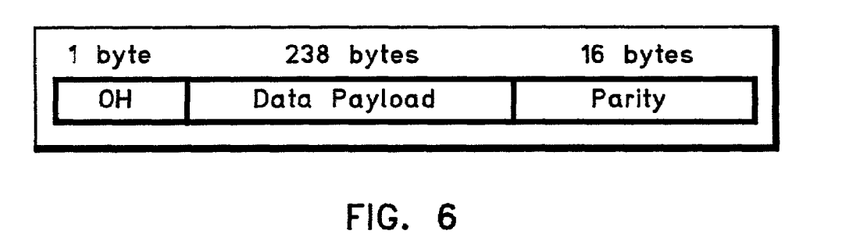
FIG. 6 is an example of a subframe consisting of a 255-byte RS(255,239) block with an overhead (OH) byte as the first byte, followed by 238 user payload bytes, and 16 bytes of RS parity.

FIG. 6 is an example of a subframe consisting of a 255-byte RS(255,239) block with an overhead (OH) byte as the first byte, followed by 238 user payload bytes, and 16 bytes of RS parity. The OH byte may be used as a Frame Synchronization Byte (FSB) or other programmable function.

Figure 7:
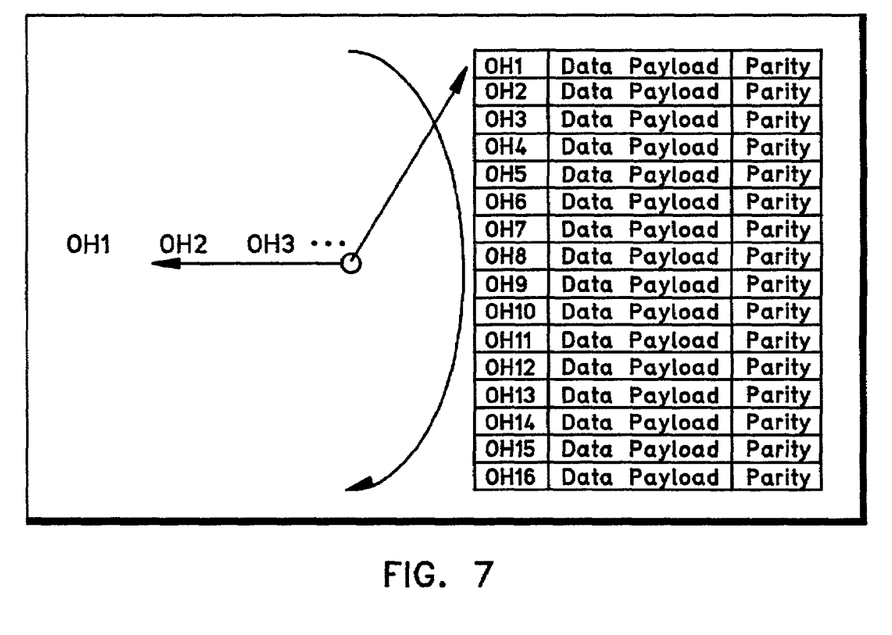
FIG. 7 illustrates the stacking of subframes in a frame.

FIG. 7 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/permissioned to be received at a particular node. Table 1 provides an example of how the FSB types are defined.

TABLE 1

Frame Synchronization Byte Definitions

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | FSB 2 | | | | | | | | FSB 1 | | | | | | | |
| Mode | rw | rw | rw | rw | rw | rw | rw | rw | rw | rw | rw | rw | rw | rw | rw | rw |
| Default | 0 | 0 | 1 | 0 | 1 | 0 | 0 | 0 | 1 | 1 | 1 | 1 | 0 | 1 | 1 | 0 |

| Bit Positions | Function | Description |
|---|---|---|
| 15:8 | FSB 2 | Frame Synchronization Byte 2 (Default value = 28h) |
| 7:0 | FSB 1 | Frame Synchronization Byte 1 (Default value = F6h) |

Accommodations are made for two separate frame synchronization bytes.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the number of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting. The fewer consecutive FSB groups required to achieve synchronization, the shorter the acquisition time. The more consecutive bad FSB groups required to lose synchronization, the greater the system tolerance of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 2

Frame Synchronization Byte Locations Register

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 1 | 1 | 1 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9 | OH#7 | 0: Not a Frame Synchronization Byte (Default)<br>1: Frame Synchronization Byte (FSB) |
| 8 | OH#8 | 0: Not a Frame Synchronization Byte (Default)<br>1: Frame Synchronization Byte (FSB) |
| 7 | OH#9 | 0: Not a Frame Synchronization Byte (Default)<br>1: Frame Synchronization Byte (FSB) |
| 6 | OH#10 | 0: Not a Frame Synchronization Byte (Default)<br>1: Frame Synchronization Byte (FSB) |
| 5 | OH#11 | 0: Not a Frame Synchronization Byte (Default)<br>1: Frame Synchronization Byte (FSB) |
| 4 | OH#12 | 0: Not a Frame Synchronization Byte (Default)<br>1: Frame Synchronization Byte (FSB) |
| 3 | OH#13 | 0: Not a Frame Synchronization Byte (Default)<br>1: Frame Synchronization Byte (FSB) |
| 2 | OH#14 | 0: Not a Frame Synchronization Byte (Default)<br>1: Frame Synchronization Byte (FSB) |
| 1 | OH#15 | 0: Not a Frame Synchronization Byte (Default)<br>1: Frame Synchronization Byte (FSB) |
| 0 | OH#16 | 0: Not a Frame Synchronization Byte (Default)<br>1: Frame Synchronization Byte (FSB) |

This table defines which of the overhead bytes (1–16) are going to be used as FSBs.

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: FSB 1 (Default)<br>1: FSB 2 |
| 14 | OH#2 | 0: FSB 1 (Default)<br>1: FSB 2 |
| 13 | OH#3 | 0: FSB 1 (Default)<br>1: FSB 2 |
| 12 | OH#4 | 0: FSB 1<br>1: FSB 2 (Default) |
| 11 | OH#5 | 0: FSB 1<br>1: FSB 2 (Default) |
| 10 | OH#6 | 0: FSB 1<br>1: FSB 2 (Default) |
| 9 | OH#7 | 0: FSB 1 (Default)<br>1: FSB 2 |
| 8 | OH#8 | 0: FSB 1 (Default)<br>1: FSB 2 |
| 7 | OH#9 | 0: FSB 1 (Default)<br>1: FSB 2 |

TABLE 3-continued

Frame Synchronization Byte Types

| | | |
|---|---|---|
| 6 | OH#10 | 0: FSB 1 (Default) |
| | | 1: FSB 2 |
| 5 | OH#11 | 0: FSB 1 (Default) |
| | | 1: FSB 2 |
| 4 | OH#12 | 0: FSB 1 (Default) |
| | | 1: FSB 2 |
| 3 | OH#13 | 0: FSB 1 (Default) |
| | | 1: FSB 2 |
| 2 | OH#14 | 0: FSB 1 (Default) |
| | | 1: FSB 2 |
| 1 | OH#15 | 0: FSB 1 (Default) |
| | | 1: FSB 2 |
| 0 | OH#16 | 0: FSB 1 (Default) |
| | | 1: FSB 2 |

NOTE: If an OH byte is not defined to be an FSB in the Decoder Frame Synchronization Byte Locations Register, the corresponding bit in this register has no significance.

TABLE 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | | FSB Errors Allowed | | | | |
| Mode | rw | rw | rw | rw | rw | rw | rw | rw | rw | rw | rw | rw | rw | rw | rw | rw |
| Default | 0 | 0 | 1 | 0 | 0 | 1 | 0 | 0 | 0 | 0 | 0 | 0 | 1 | 0 | 0 | 0 |

| Bit Positions | Function | Description |
|---|---|---|
| 15:12 | Check to go In-Frame | Number of correct consecutive FSB groups required to go In-Frame. (Default value = 2) |
| 11:8 | Check to go Out-of-Frame | Number of incorrect consecutive FSB groups required to go Out-of-Frame. (Default value = 4) |
| 7:5 | Unused | |
| 5:0 | FSB Errors Allowed | The total number of erred bits allowed in a group of FSBs to still consider a match. (Default value = 8). This number is used regardless of the synchronization state (In-Frame or Out-of-Frame). |

Table 4 sets the synchronization thresholding parameters.

A system and method have been provided that illustrate the advantages of providing programmable FSB locations. The advantage of this invention is the ability to fully customize the synchronization methodology, to optimize robustness to noise and synchronization time. The invention specifically illustrates an example using programmable FSB locations, programmable gain synchronization, programmable lose synchronization parameters, and programmable bit error tolerance within the FSBs themselves. However, the invention is not limited to a particular number of FSB values, or any specific framing structure. The invention permits users to create different networks that are logically separated from each other so that receivers can easily distinguish between different data sources. Other variations and embodiments of the invention will occur to those skilled in the art.

We claim:

1. In the transmission of a multidimensional digital frame structure, a method for variably programming the location of frame synchronization bytes, the method comprising:

defining a frame with an overhead section having a predetermined number of bytes; and selecting the location of the bytes in the overhead section to be used for frame synchronization wherein defining the frames includes the overhead section having a first plurality of overhead byte locations; and wherein selecting the location of the bytes in the overhead section to be used for frame synchronization includes selecting locations in the range from zero to the first plurality of byte locations.

2. The method of claim 1 further comprising:

selecting the number of bytes in the overhead section to be used for frame synchronization.

3. The method of claim 2 wherein selecting the number of bytes in the overhead section includes selecting a first number of bytes in the range from zero to the first plurality of bytes; and wherein selecting the location of the bytes in the overhead section to be used for frame synchronization includes selecting the first number of byte locations.

4. The method of claim 1 further comprising:

defining a superframe structure with a predetermined number of frames per superframe; and wherein selecting the location of frame synchronization bytes in the overhead section includes selecting the location of bytes in the overhead section of each frame.

5. The method of claim 4 wherein defining a superframe structure with a predetermined number of frames per superframe includes defining a first and a second frame in the superframe; and
   wherein selecting the location of frame synchronization bytes in the overhead section includes selecting a first byte location in the first frame and a second byte location in the second frame.

6. The method of claim 5 wherein defining a superframe structure with a predetermined number of frames per superframe includes defining a superframe consisting of a first, second, third, and fourth frame; and
   wherein selecting the location of frame synchronization bytes in the overhead section includes selecting a first byte location in the first frame, a second byte location in the second frame, a third byte location in the third frame, and a fourth byte location in the fourth frame.

7. The method of claim 6 wherein selecting the location of frame synchronization bytes in the overhead section includes selecting no byte locations in the second, third, and fourth frames.

8. The method of claim 1 further comprising:
   selecting the value of the frame synchronization bytes.

9. The method of claim 8 wherein defining a frame includes defining each byte having a second plurality of bits; and
   wherein selecting the value of the frame synchronization bytes includes selecting a second plurality of bits for each frame synchronization byte value.

10. The method of claim 9 wherein selecting the location of frame synchronization bytes in the overhead section includes locating a plurality of frame synchronization byte values in a plurality of byte locations.

11. The method of claim 10 wherein selecting the location of frame synchronization byte values includes selecting frame synchronization bytes, having a first value, in a first location, and frame synchronization bytes, having a second value, in a second location.

12. In the receiving of a multidimensional digital frame structure, a method for variably programming the location of frame synchronization bytes, the method comprising:
   defining a frame with an overhead section having a predetermined number of bytes;
   selecting the location of the bytes in the overhead section to be used for frame synchronization; and
   selecting the bit error rate required for the recognition of a frame synchronization byte; wherein,
   selecting the location of frame synchronization bytes includes selecting frame synchronization bytes, having a first bit error rate, in a first location, and frame synchronization bytes, having a second bit error rate, in a second location.

13. The method of claim 12 wherein selecting a frame synchronization byte bit error rate includes selecting an average bit error rate for the frame synchronization bytes in the selected location.

14. The method of claim 12 further comprising:
   selecting the number of bytes in the overhead section to be used for frame synchronization.

15. The method of claim 12 further comprising:
   selecting the value of the frame synchronization bytes.

16. A method for variably programming the location of frame synchronization bytes in the communication of a multidimensional digital frame structure, the method comprising:
   selecting a location of frame synchronization bytes in the overhead section of a transmitted frame;
   sending the frame;
   receiving the frame;
   selecting the number of consecutive frames that must be recognized;
   synchronizing the received frame in response to the selected number of recognized frames;
   selecting the location of the bytes to be used for the frame synchronization of received frames;
   wherein synchronizing the received frame includes recognizing frame synchronization bytes in response to the selected locations of the frame synchronization bytes in the received frame;
   wherein selecting the location of the frame synchronization bytes in a transmitted frame includes selecting first locations in a first frame, and second locations in a second frame; and
   wherein synchronizing the received frame in response to recognizing the frame synchronization bytes includes synchronizing the received frame in response to recognizing frame synchronization bytes in the first locations in the first frame and the second locations in the second frame.

17. The method of claim 16 wherein selecting the location of the frame synchronization bytes in the received frame includes selecting first locations; and
   wherein synchronizing the received frame in response to recognizing the frame synchronization bytes includes synchronizing the received frame in response to recognizing frame synchronization bytes in the first locations.

18. The method of claim 16 wherein selecting the location of frame synchronization bytes in the overhead section of a transmitted frame includes selecting a first number of frame synchronization byte locations; and
   wherein selecting the location of the bytes to be used for frame synchronization of the received frame includes selecting locations for the first number of frame synchronization bytes.

19. The method of claim 16 wherein selecting the location of frame synchronization bytes in the overhead section of a transmitted frame includes selecting a first number of frame synchronization bytes in a location;
   wherein selecting the location of the bytes to be used for frame synchronization of the received frame includes selecting a second number of frame synchronization bytes in the location, less than the first number; and
   wherein synchronizing the received frame in response to recognizing the frame synchronization bytes includes synchronizing the received frame in response to recognizing the second number of frame synchronization bytes in the selected location.

20. The method of claim 16 further comprising:
   selecting the bit error rate required for the recognition of a frame synchronization byte in a received frame.

21. The method of claim 20 wherein selecting a bit error rate includes selecting an average bit error rate for the frame synchronization bytes in the selected locations.

22. The method of claim 20 wherein synchronizing the received frame in response to recognizing the frame synchronization bytes includes recognizing frame synchronization bytes having a bit error rate less than, or equal to, the selected frame synchronization bit error rate.

23. The method of claim 16 further comprising:
   defining a superframe structure with a predetermined number of frames per superframe; and
   wherein selecting the location of frame synchronization bytes in the overhead section of a transmitted frame includes selecting the location of bytes to be used for synchronization in the overhead section of each frame of the superframe;

wherein sending the frame includes sending frames in the superframe structure; and wherein synchronizing the received frame in response to recognizing the frame synchronization bytes includes recognizing the location of frame synchronization bytes in each frame of the superframe.

24. The method of claim 23 further comprising:

selecting the value of the frame synchronization byte in each selected location of the transmitted frame.

25. The method of claim 24 wherein selecting the value of the frame synchronization byte in each location of the transmitted frame includes selecting frame synchronization bytes having a first value in first locations;

wherein selecting the value of each frame synchronization byte in the received frame includes selecting frame synchronization bytes, having the first value in the first locations.

26. The method of claim 24 wherein selecting the value of the frame synchronization byte in each location of the transmitted frame includes selecting a first frame synchronization byte value in first locations and a second frame synchronization byte value in second locations;

wherein selecting the value of each frame synchronization byte in the received frame includes selecting the first frame synchronization byte value in third locations, fewer in number than the first locations, and the second frame synchronization byte value in fourth locations, fewer in number than the second locations; and wherein synchronizing the received frame in response to recognizing the frame synchronization bytes includes synchronizing the received frame in response to recognizing the frame synchronization bytes having the first value in the third locations, and the of frame synchronization bytes having the second value in the fourth locations.

27. The method of claim 16 further comprising:

selecting the number of frame synchronization bytes required for the recognition of a received frame.

28. The method of claim 27 wherein selecting the number of frame synchronization bytes required for the recognition of a received frame includes selecting a number of bytes for each frame of the superframe; and wherein synchronizing the received frame in response to recognizing the frame synchronization bytes includes recognizing the selected number of frame synchronization bytes in each frame of the superframe.

29. The method of claim 28 wherein selecting the number of frame synchronization bytes required for the recognition of a received frame includes selecting a first number of frame synchronization bytes in a first number of locations of a first frame; and wherein synchronizing the received frame in response to recognizing frame synchronization bytes includes recognizing the first number of frame synchronization bytes in the first number of locations of the first frame.

30. The method of claim 16 further comprising:

selecting the value of the frame synchronization byte in each byte location; and wherein synchronizing the received frame in response to recognizing the frame synchronization bytes includes recognizing the values of the frame synchronization bytes in the selected locations.

31. The method of claim 30 wherein selecting the value of each frame synchronization byte includes selecting a first frame synchronization value in first locations, and a second frame synchronization value in second locations; and wherein synchronizing the received frame includes synchronizing the received frame in response to recognizing the first frame synchronization value in the first locations, and the second frame synchronization value in the second locations.

32. In a multidimensional digital frame structure, a transmitter system for variably programming the location of frame synchronization bytes, the system comprising:

a frame generator including an overhead generator to generate the overhead section of a frame, a payload generator to generate the payload section of the frame, and an encoder to provide forward error correction (FEC) for the frame; and wherein the overhead generator includes an input to select the location of frame synchronization bytes in the overhead section;

wherein the frame generator supplies a frame with a first plurality of overhead bytes; and wherein the overhead generator accepts commands to select byte locations in the range from zero to the first plurality.

33. The system of claim 32 wherein the frame generator forms a superframe structure with a predetermined number of frames per superframe; and wherein the overhead generator supplies a selectable number of frame synchronization byte locations for the overhead section of each frame of the superframe.

34. The system of claim 33 wherein the frame generator forms a superframe having a first, second, third, and fourth frame; and wherein the overhead generator supplies first selected frame synchronization byte locations for the first frame, second frame synchronization byte locations for the second frame, third frame synchronization bytes for the third frame, and fourth frame synchronization bytes for the fourth frame.

35. The system of claim 32 wherein the overhead generator accepts commands to select the number of frame synchronization bytes.

36. The system of claim 32 wherein the overhead generator has an input to accept commands for selecting the value of the frame synchronization bytes in each selected byte location.

37. The system of claim 36 wherein the overhead generator selects a second plurality of bits for each frame synchronization byte, where each byte includes the second plurality of bits.

38. The system of claim 37 wherein the overhead generator selects frame synchronization byte values from a plurality of byte values.

39. The system of claim 38 wherein the overhead generator selects frame synchronization byte values in the range from zero to the first plurality, for each frame.

40. The system of claim 39 wherein the overhead generator selects frame synchronization bytes having a first value in first locations, and frame synchronization bytes having a second value in second locations.

41. In a multidimensional digital frame structure, a receiver system for variably programming the location of frame synchronization bytes, the system comprising:

a frame receiver including an overhead receiver to receive the overhead section of a frame, a payload receiver to receive the payload section of the frame, and a decoder to provide a forward error corrected (FEC) frame; and wherein the overhead receiver includes an input to select the location of frame synchronization bytes in the overhead section to be used for frame synchronization;

wherein the frame receiver supplies a frame with a first plurality of overhead byte locations; and wherein the overhead receiver accepts commands to select frame synchronization byte locations in the range from zero to the first plurality.

42. The system of claim 41 wherein the frame receiver forms a superframe structure with a predetermined number of frames per superframe; and wherein the overhead receiver selects the location of frame synchronization bytes required for the recognition of a received frame from the overhead section of each frame of the superframe.

43. The system of claim 42 wherein the overhead receiver selects the number of frame synchronization bytes.

44. The system of claim 41 wherein the frame receiver forms a superframe with a first, second, third, and fourth frame; and wherein the overhead receiver selects first frame synchronization byte locations for the first frame, second frame synchronization byte locations for the second frame, third frame synchronization bytes for the third frame, and fourth frame synchronization bytes for the fourth frame.

45. The system of claim 41 wherein the overhead receiver has an input to accept commands for selecting the value of the frame synchronization bytes for each byte location.

46. The system of claim 45 wherein the overhead receiver selects a second plurality of bits for each frame synchronization byte value, where each byte includes a second plurality of bits.

47. The system of claim 46 wherein the overhead receiver selects frame synchronization byte values from a plurality of byte values.

48. The system of claim 47 wherein the overhead receiver selects frame synchronization byte values, in each frame, in the range from zero to the first plurality of byte values.

49. The system of claim 48 wherein the overhead receiver selects frame synchronization bytes, having a first value, in first byte locations, and frame synchronization bytes, having a second value, in second byte locations.

50. The system of claim 41 wherein the overhead receiver has an input to accept commands for selecting the bit error rate required for the recognition of each selected frame synchronization byte location.

51. The system of claim 50 wherein the overhead receiver selects an average bit error rate for frame synchronization bytes in the selected locations.

52. A system for variably programming the location of frame synchronization bytes in the communication of a multidimensional digital frame structure, the system comprising:

a transmitter with a frame generator including an overhead generator having an input to accept commands for selecting the location of frame synchronization bytes in the overhead section of a transmitted frame; and a receiver with a frame receiver including an overhead receiver having an input to accept commands for selecting the location of frame synchronization bytes required for synchronizing the received frame, the overhead receiver synchronizing the frame in response to recognizing the frame synchronization bytes.

* * * * *